United States Patent
Appalla et al.

(10) Patent No.: US 9,832,108 B2
(45) Date of Patent: Nov. 28, 2017

(54) FAST DESIGNATED ROUTER TRANSITIONS IN BROADCAST NETWORKS FOR LINK STATE PROTOCOLS

(75) Inventors: Rama Suryanarayana Appalla, Nashua, NH (US); Pamela LeBlanc, West Newbury, MA (US); Michael Haight, Hudson, NH (US)

(73) Assignee: Extreme Networks, Inc., San Jose, CA (US)

( * ) Notice: Subject to any disclaimer, the term of this patent is extended or adjusted under 35 U.S.C. 154(b) by 247 days.

(21) Appl. No.: 13/303,347

(22) Filed: Nov. 23, 2011

(65) Prior Publication Data

US 2013/0128718 A1    May 23, 2013

(51) Int. Cl.
| | |
|---|---|
| *H04L 12/703* | (2013.01) |
| *H04L 12/761* | (2013.01) |
| *H04L 12/721* | (2013.01) |
| *H04L 12/751* | (2013.01) |

(52) U.S. Cl.
CPC .............. *H04L 45/28* (2013.01); *H04L 45/16* (2013.01); *H04L 45/02* (2013.01); *H04L 45/32* (2013.01)

(58) Field of Classification Search
CPC ................................ H04L 45/28; H04L 45/16
USPC ................................................. 370/216–221
See application file for complete search history.

(56) References Cited

U.S. PATENT DOCUMENTS

| | | | |
|---|---|---|---|
| 7,173,934 B2 | 2/2007 | Lapuh et al. | |
| 7,362,709 B1* | 4/2008 | Hui | H04L 45/00 |
| | | | 370/221 |
| 7,639,680 B1* | 12/2009 | Roy | H04L 45/02 |
| | | | 370/221 |
| 2005/0135231 A1* | 6/2005 | Bellovin | H04L 45/02 |
| | | | 370/216 |
| 2005/0195754 A1* | 9/2005 | Nosella | H04L 1/22 |
| | | | 370/255 |
| 2008/0247393 A1* | 10/2008 | Ong et al. | 370/392 |
| 2009/0086622 A1* | 4/2009 | Ng | H04L 45/02 |
| | | | 370/219 |
| 2010/0103813 A1* | 4/2010 | Allan et al. | 370/218 |
| 2010/0189113 A1* | 7/2010 | Csaszar et al. | 370/400 |
| 2010/0296414 A1* | 11/2010 | Vohra et al. | 370/254 |
| 2011/0044348 A1* | 2/2011 | Kini et al. | 370/401 |
| 2011/0149721 A1* | 6/2011 | Yang | H04L 41/0654 |
| | | | 370/216 |
| 2013/0007252 A1* | 1/2013 | Welin et al. | 709/223 |

* cited by examiner

*Primary Examiner* — Gary Mui
(74) *Attorney, Agent, or Firm* — Haley Guiliano LLP

(57) ABSTRACT

A method, apparatus and computer program product for providing quick designated router transitions in broadcast networks is presented. An Alternate Designated Router (ADR) in a network detects node failure of a Designated Router (DR) prior to other nodes of the network detecting the failure of the DR. In response to the detecting node failure of the DR, the ADR floods the network with a link state packet of a pseudonode within the network. At least one other node of the network detects failure of the DR. The at least one other node computes routes to take into account the failure of the DR by the at least one other node of the network, wherein there is minimal traffic loss since the pseudonodes link state packet is already present before the computing routes takes place.

21 Claims, 7 Drawing Sheets

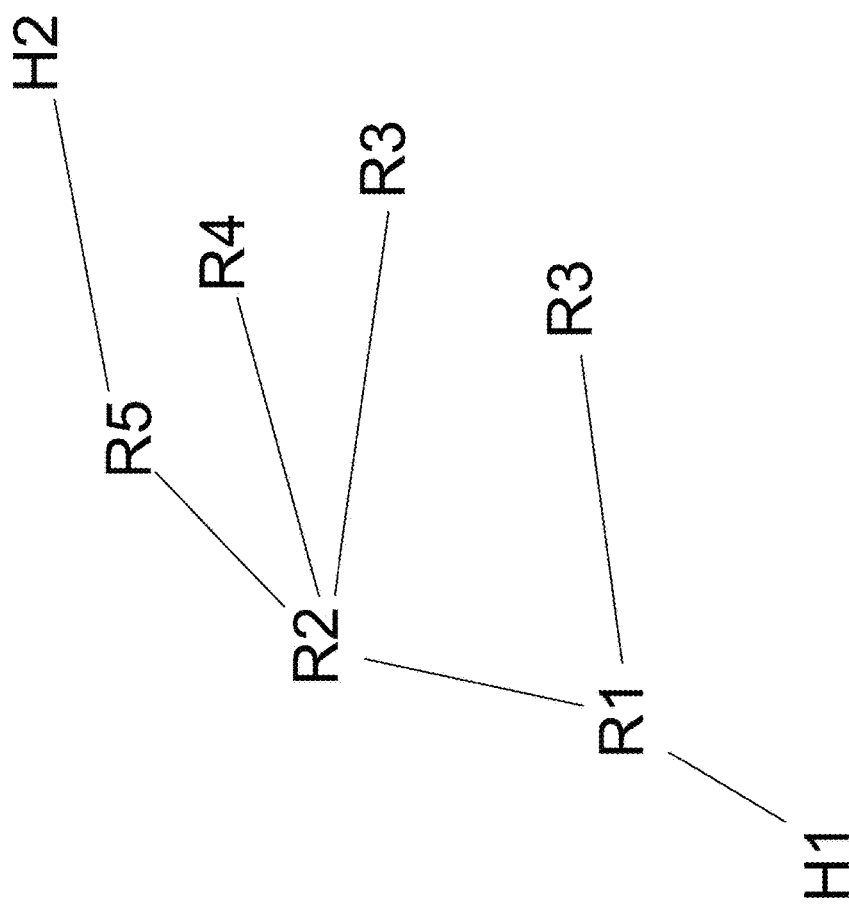

FAST DESIGNATED ROUTER TRANSITIONS IN BROADCAST NETWORKS FOR LINK STATE PROTOCOLS

BACKGROUND

Wireless networks have become ubiquitous. A wireless network refers to any type of computer network that is wireless, and is commonly associated with a telecommunications network whose interconnections between nodes is implemented without the use of wires. Wireless telecommunications networks are generally implemented with some type of remote information transmission system that uses electromagnetic waves, such as radio waves, for the carrier and this implementation usually takes place at the physical level or layer of the network.

A typical wireless network may include one or more Access Points (APs), one or more Wireless Controllers (WCs) and one or more Mobility Units (MUs). MUs can include laptops, cell phones, Personal Digital Assistants (PDAs) and the like.

A wireless AP is a device that allows wireless communication devices to connect to a wireless network. The access point allows wireless mobile units to communicate with each other and to communicate with infrastructure connected to the access point.

Wireless Local Area Networks (LANs) are a popular and inexpensive way to allow multiple users of "mobile units" (MUs) to communicate with each other, to access a wired LAN, to access a local server, to access a remote server, such as over the Internet, etc. A wireless local area network (WLAN) typically includes an Access Point (AP) and one or more mobile units.

The server can provide services, such as access to applications like an email system, a word processing program, an accounting system and/or a dedicated database. Wireless LANs are employed within such facilities as businesses, university classrooms or buildings, airport lounges, hotel meeting rooms, etc. When a user is physically located in the vicinity of an access point, the transceiver of the mobile unit communicates with the access point and a connection to the wireless LAN is established.

APs and mobile units transmit data in units referred to as frames over a shared-communications channel. Frames transmitted from a mobile unit to an AP are referred to as uplink frames, and frames transmitted from an AP to a mobile unit are referred to as downlink frames. In a situation where two or more mobile units (or an AP and a mobile unit) transmit frames simultaneously, then one or more of the frames can become corrupted, referred to as a collision. As a result, Wireless Local Area Networks (WLANs) typically employ one or more protocols to ensure that a mobile unit or AP can gain exclusive access to the shared-communications channel for a predetermined interval of time in order to transmit its frames without collisions occurring.

Certain wireless network protocols (e.g., Institute of Electrical and Electronics Engineers [IEEE] 802.11, etc.) provide for the AP to periodically broadcast a special frame called a beacon that can be heard by the mobile units in the BSA (basic service area), the area covered by the AP. The beacon contains a variety of information that enables the mobile units to establish and maintain communications in an orderly fashion, such as a timestamp, which enables mobile units to synchronize their local clocks, and signaling information (e.g., channel number, frequency hopping pattern, dwell time, etc.).

A wireless network may also include one or more Virtual Local Area Networks (VLANs). A VLAN includes a group of devices with a common set of requirements that communicate as if they were attached to the same broadcast domain, regardless of their physical location. A VLAN has the same attributes as a physical LAN, but allows for devices to be grouped together even if they are not located on the same network switch.

Split-plane deployment re-uses existing switching infrastructure components at a customer site for wireless data forwarding with the wireless control plane (WCP) functions implemented in a virtual or physical appliance within an enterprise data center. WCP functionality is responsible for configuration, control and monitoring of a wireless access medium. MU association, authentication and dissociation are handled by the WCP. The wireless switching plane (WSP) performs the repetitive but high-volume data forwarding actions.

In a link state protocol, all routers (nodes) connected in a broadcast domain (e.g. a Virtual Local Area Network or VLAN) are not adjacent to all other nodes in order to optimize Shortest Path First (SPF) calculations. All of the nodes are adjacent to a psuedonode. This reduces number of links, thereby reducing the computational complexity. The psuedonode is usually simulated by a Designated Router (DR) in the broadcast domain. Instead of only being a member of one broadcast domain on a segment, each node needed to be configured for an additional broadcast domain on that segment, and configured for dual membership. The nodes were made members of two VLANs in which only one node was eligible to become designated router for each vlan respectively. This extra configuration overhead and complexity allowed for the case where one DR fails the other DR in a different VLAN takes over, which avoids the single broadcast domain transition loss problem outlined above.

SUMMARY

Conventional mechanisms such as those explained above suffer from a variety of deficiencies. One such deficiency occurs when a DR fails. If the DR fails, the nodes elect a new DR and during this election process, there is traffic loss until the new DR advertises its link state information.

The presently described method and apparatus for providing quick designated router transitions in broadcast networks for link state protocols provides a mechanism for fast transition, and provides a method to converge quickly. The present invention also provides simplified configuration as there is no longer a need to create a multiple broadcast domain VLAN configuration where only one node is restricted to becoming a designated router and the rest of the nodes as having an in-eligible designated router priority. While prior solutions still result in a certain amount of traffic loss, the present invention provides a solution that is fast. Further, the presently described invention increases the resiliency of protocols that rely on the stability of unicast route tables such as multicast. A fast DR transition where routes are not flapped would directly benefit multicast. Route flapping is where routes are learned and then have to be re-learned.

In a particular embodiment of a method for providing quick designated router transitions in broadcast networks for link state protocols the method includes detecting, by an Alternate Designated Router (ADR) in a network, node failure of a Designated Router (DR) prior to other nodes of the network detecting the failure of the DR. The method further includes in response to the detecting node failure of the DR by the ADR, flooding the network with a link state packet of a pseudonode within the network. Additionally the method includes detecting by at least one other node of the network failure of the DR, and computing routes to take into account the failure of the DR by the at least one other node of the network, wherein there is minimal traffic loss since the pseudonodes link state packet is already present before the computing routes takes place.

Other embodiments include a computer readable medium having computer readable code thereon for providing quick designated router transitions in broadcast networks for link state protocols. The computer readable medium includes instructions for detecting, by an Alternate Designated Router (ADR) in a network, node failure of a Designated Router (DR) prior to other nodes of the network detecting the failure of the DR. The computer readable medium further includes instructions for in response to the detecting node failure of the DR by the ADR, flooding the network with a link state packet of a pseudonode within the network. Additionally the computer readable medium includes instructions for detecting by at least one other node of the network failure of the DR, and computing routes to take into account the failure of the DR by the at least one other node of the network, wherein there is minimal traffic loss since the pseudonodes link state packet is already present before the computing routes takes place.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides quick designated router transitions in broadcast networks for link state protocols as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing quick designated router transitions in broadcast networks for link state protocols as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1B comprises a network graph of the network of FIG. 1;

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Figure 1A:
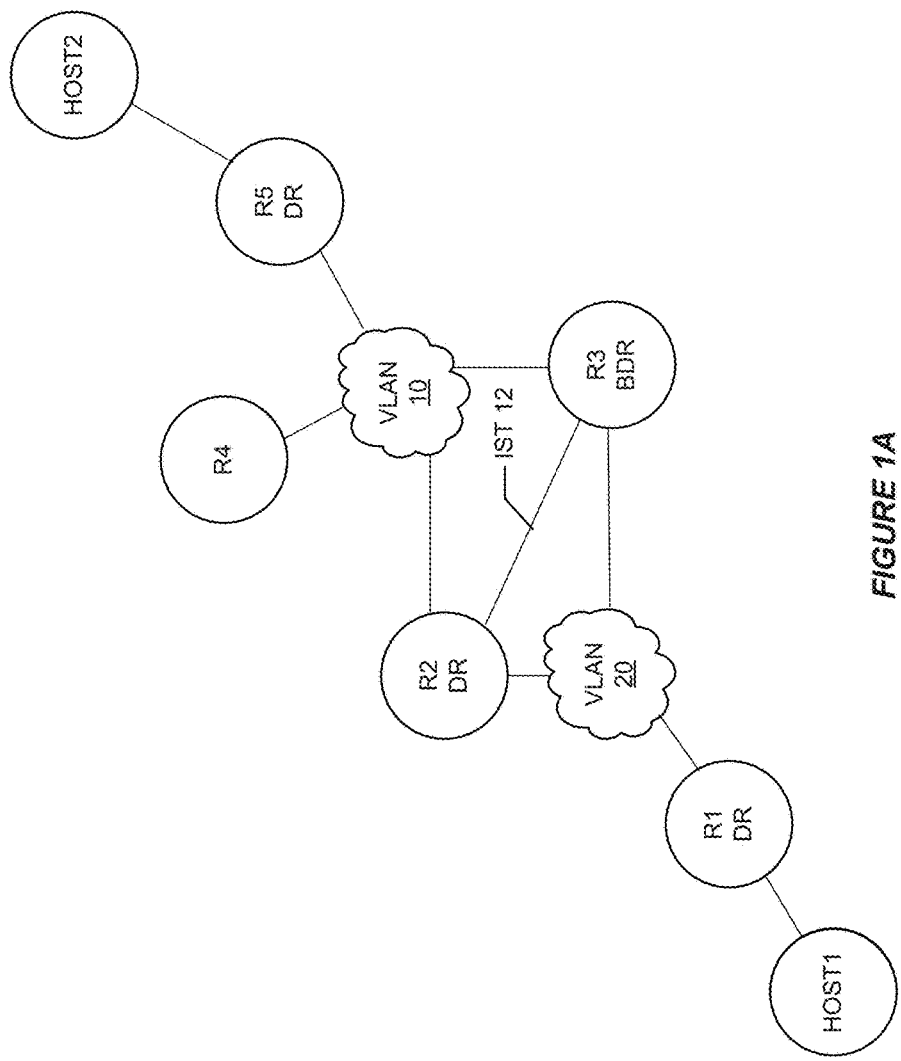
FIG. 1A comprises a block diagram of a network in accordance with embodiments of the invention.

Referring to FIG. 1A, a network is shown. Network 20 includes a first host HOST1 in communication with a designated router R1. R1 is in communication with a Virtual Local Area Network (VLAN) 20 which is in communication with VLAN 10 by way of Designated Router (DR) R2 or Backup Designated Router (BDR) R3. In this embodiment the DR R2 also simulates a pseudonode (not shown). The pseudonode is directly adjacent to all other nodes in the network, thereby making Shortest Path First (SPF) calculations more efficient. VLAN 10 is also in communication with R4 and R5, and R5 is in communication with Host2. R2 and R3 are in communication with each other by way of Inter Switch trunk (IST) 12. FIG. 1B shows a network graph of the network of FIG. 1. A communication path form H1 to H2 includes R1, R2, and R5.

Figure 2A:
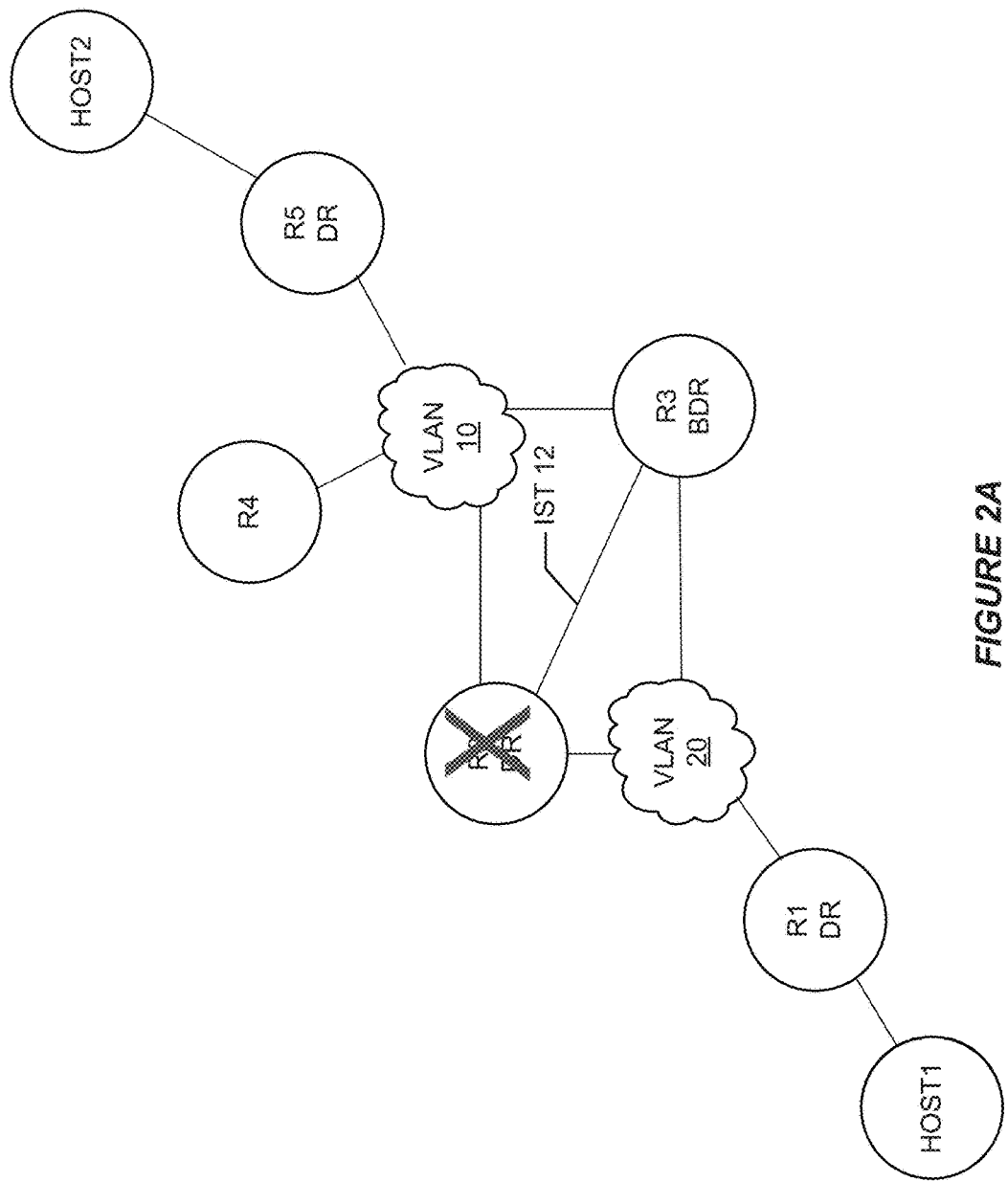
FIG. 2A comprises a block diagram of a network wherein the Designated Router has failed in accordance with embodiments of the invention.
Figure 2B:
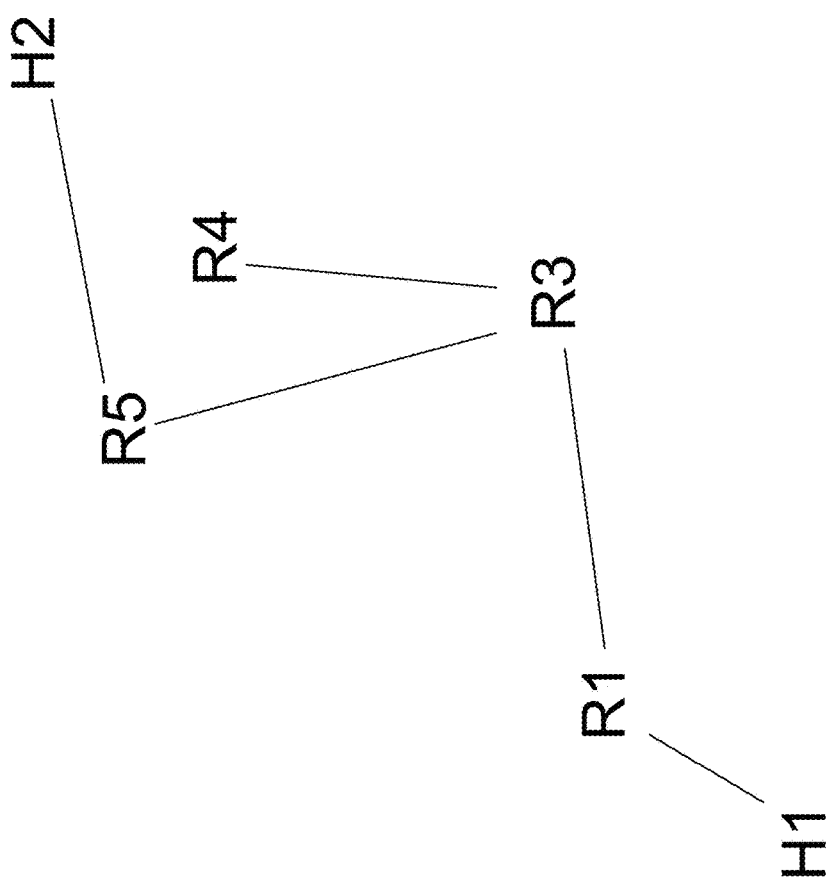
FIG. 2B comprises a network graph of the network of FIG. 2.

Referring now to FIG. 2A, DR R2 has failed. In the present invention, the alternate designated router (BDR R3) has a mechanism for detecting the DR R2 node failure in advance of all other nodes. For example, by way of IST 12, BDR R3 detects the node failure of DR R2 before other nodes are able to detect the failure of DR R2.

As soon as this advanced detection occurs, BDR R3 floods the pseudonode's link state packet immediately. When the rest of the nodes detect the DR failure and run their route computations, since the pseudonode's link state packet is already present, the network does not see a node down which would have resulted in route flapping. The new result would be minimal traffic loss. This would help other protocols, such as multicast, that rely on the unicast route table information and would improve multicast convergence as the multicast protocols would not see any route flapping changes during the failure of the designated node. FIG. 2A is a network graph showing the network of FIG. 2A after the failure of DR R2.

Figure 3A:
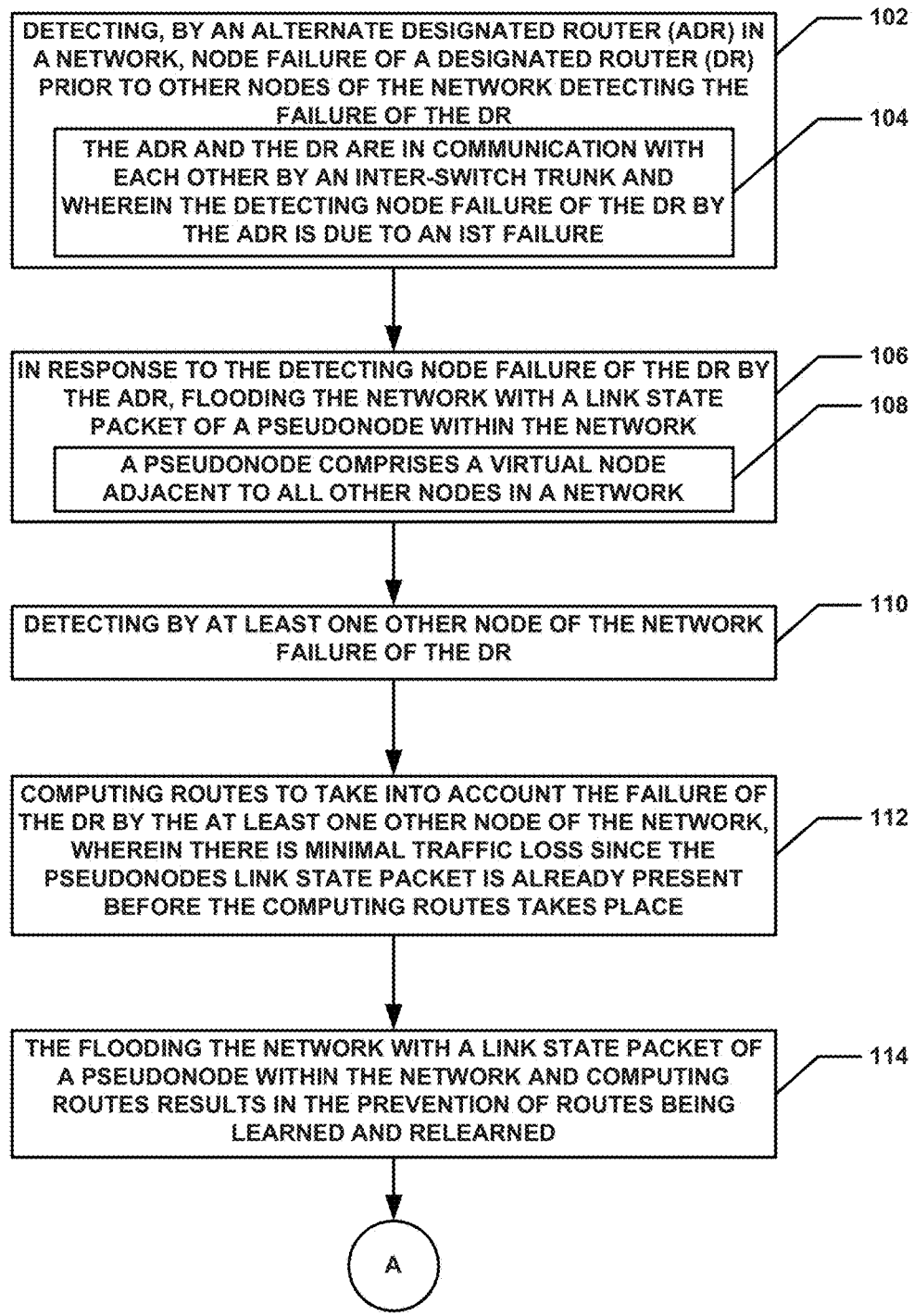
FIG. 3 comprises a flow diagram of a particular embodiment of a method for performing quick designated router transitions in broadcast networks for link state protocols in accordance with embodiments of the invention.
Figure 3B:
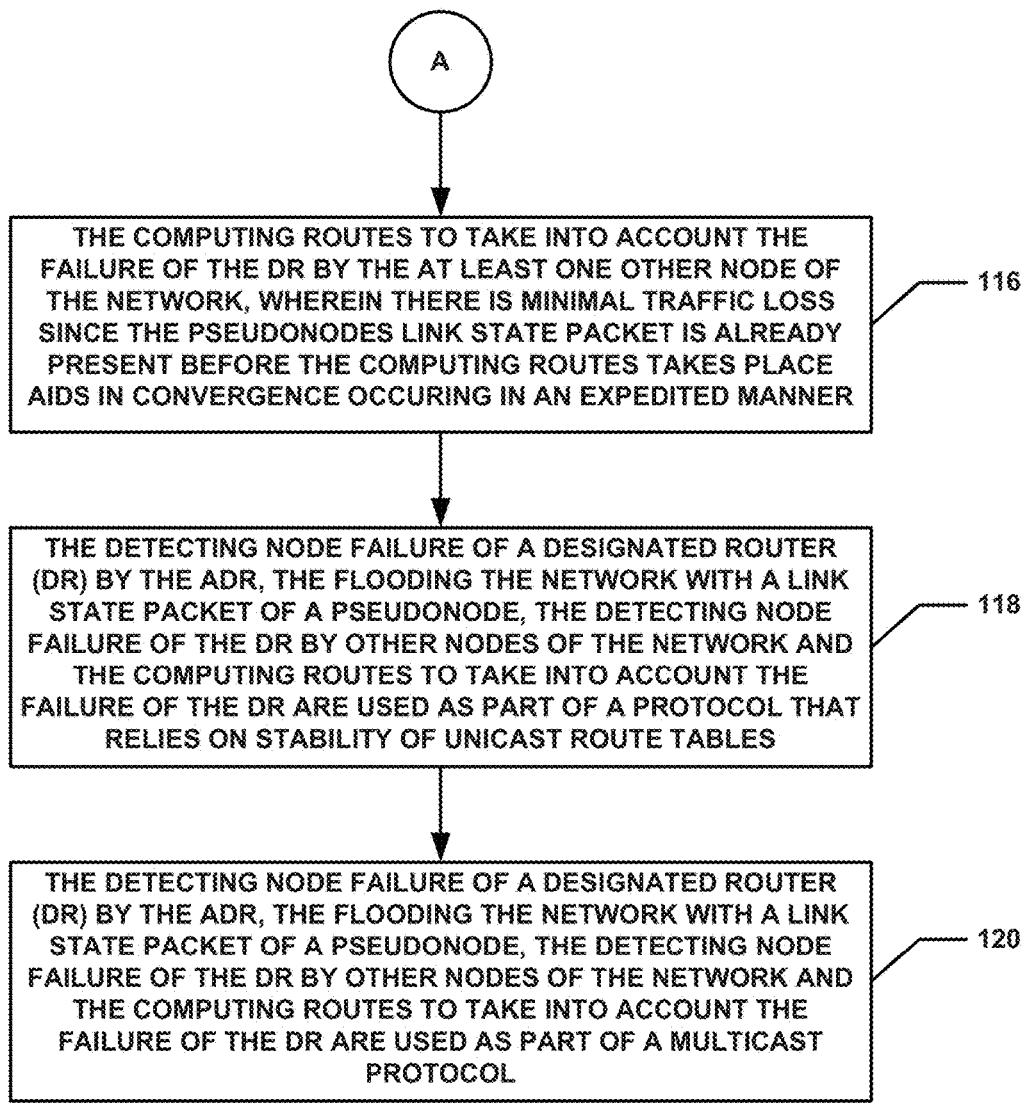

A flow chart of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, in a particular embodiment a method 100 for providing quick designated router transitions in broadcast networks for link state protocols begins with processing block 102 which discloses detecting, by an Alternate Designated Router (ADR) in a network, node failure of a Designated Router (DR) prior to other nodes of the network detecting the failure of the DR. As shown in processing block 104, in some embodiments the ADR and the DR are in communication with each other, for example by an inter-switch trunk (IST) and wherein the detecting node failure of the DR by the ADR is due to an IST failure.

Processing block 106 states in response to the detecting node failure of the DR by the ADR, flooding the network with a link state packet of a pseudonode within the network. As shown in processing block 108, a pseudonode comprises a virtual node adjacent to all other nodes in a network.

Processing block 110 recites detecting by at least one other node of the network failure of the DR. Processing block 112 discloses computing routes to take into account the failure of the DR by the at least one other node of the network, wherein there is minimal traffic loss since the pseudonodes link state packet is already present before the computing routes takes place. Processing block 114 states the flooding the network with a link state packet of a pseudonode within the network and computing routes results in the prevention of routes being learned and relearned.

Processing continues with processing block 118 which discloses the computing routes to take into account the failure of the DR by the at least one other node of the network, wherein there is minimal traffic loss since the pseudonodes link state packet is already present before the computing routes takes place aids in convergence occurring in an expedited manner Processing block 118 states the detecting node failure of a Designated Router (DR) by the ADR, the flooding the network with a link state packet of a pseudonode, the detecting node failure of the DR by other nodes of the network and the computing routes to take into account the failure of the DR are used as part of a protocol that relies on stability of unicast route tables.

Processing block 120 recites the detecting node failure of a Designated Router (DR) by the ADR, the flooding the network with a link state packet of a pseudonode, the detecting node failure of the DR by other nodes of the network and the computing routes to take into account the failure of the DR are used as part of a multicast protocol.

Figure 4:
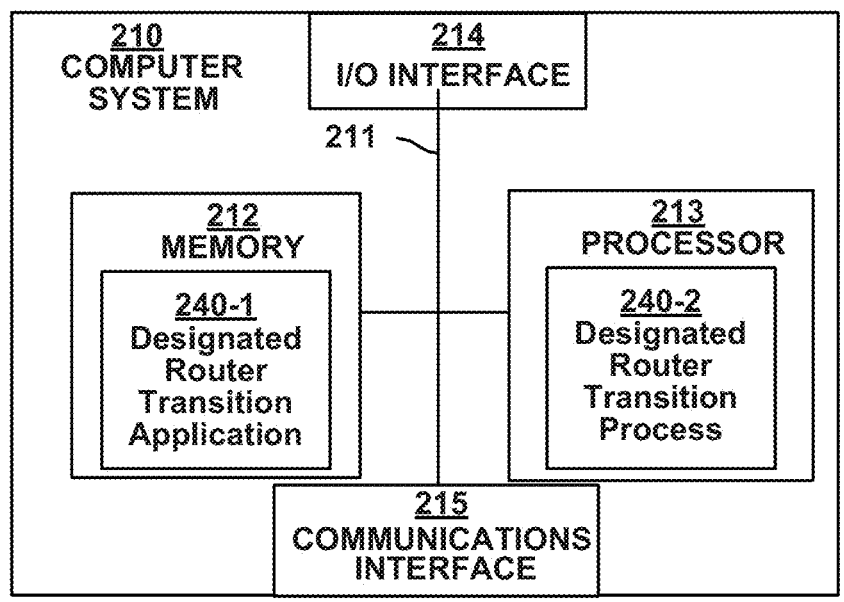
FIG. 4 illustrates an example computer system architecture for a computer system that performs quick designated router transitions in broadcast networks for link state protocols in accordance with embodiments of the invention.

FIG. 4 is a block diagram illustrating example architecture of a computer system (e.g. a BDR) 210 that executes, runs, interprets, operates or otherwise performs a designated router transition application 240-1 and designated router transition process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a designated router transition application 240-1 as explained herein. The designated router transition application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a designated router transition application 240-1. Execution of a designated router transition application 240-1 in this manner produces processing functionality in the designated router transition process 240-2. In other words, the designated router transition process 240-2 represents one or more portions or runtime instances of a designated router transition application 240-1 (or the entire a designated router transition application 240-1) performing or executing within or upon the processor 213 in the computerized device 210 at runtime.

It is noted that example configurations disclosed herein include the designated router transition application 240-1 itself (i.e., in the form of un-executed or non-performing logic instructions and/or data). The designated router transition application 240-1 may be stored on a computer readable medium (such as a floppy disk), hard disk, electronic, magnetic, optical, or other computer readable medium. A designated router transition application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a designated router transition application 240-1 in the processor 213 as the designated router transition process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the designated router transition application 240-1. Execution of designated router transition application 240-1 produces processing functionality in designated router transition process 240-2. In other words, the designated router transition process 240-2 represents one or more portions of the designated router transition application 240-1 (or the entire application) performing within or upon the processor 213 in the computer system 200.

It should be noted that, in addition to the designated router transition process 240-2, embodiments herein include the designated router transition application 240-1 itself (i.e., the un-executed or non-performing logic instructions and/or data). The designated router transition application 240-1 can be stored on a computer readable medium such as a floppy disk, hard disk, or optical medium. The designated router transition application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of designated router transition application 240-1 in processor 213 as the designated router transition process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
   detecting, by an Alternate Designated Router (ADR) in a network, node failure of a Designated Router (DR) prior to other nodes of the network detecting the failure of the DR, wherein the DR simulates a pseudonode and wherein the DR and the ADR are in communication with each other by an inter-switch trunk (IST);
   in response to detecting node failure of the DR by the ADR, flooding, by the ADR, the network with a link state packet of the pseudonode;
   detecting, by at least one other node of the network, failure of the DR; and
   computing, by the at least one other node of the network, routes to take into account the failure of the DR.

2. The method of claim 1, wherein detecting node failure of the DR by the ADR is performed via the IST.

3. The method of claim 1, wherein flooding the network with the link state packet of the pseudonode prior to computing routes by the at least one other node of the network results in the prevention of routes being learned and relearned by the at least one other node of the network.

4. The method of claim 3, wherein the prevention of routes being learned and relearned by the at least one other node of the network avoids route flapping.

5. The method of claim 1, wherein flooding the network with the link state packet of the pseudonode prior to computing routes by the at least one other node of the network aids in convergence occurring in an expedited manner.

6. The method of claim 1, wherein detecting node failure of the DR by the ADR, flooding the network with the link state packet of the pseudonode, detecting node failure of the DR by other nodes of the network, and computing routes to take into account the failure of the DR are used as part of a protocol that relies on stability of unicast route tables.

7. The method of claim 1, wherein detecting node failure of the DR by the ADR, flooding the network with the link state packet of the pseudonode, detecting node failure of the DR by other nodes of the network, and computing routes to take into account the failure of the DR are used as part of a multicast protocol.

8. A non-transitory computer readable storage medium having computer readable code thereon for providing quick designated router transitions in broadcast networks for link state protocols, the medium including instructions in which a computer system performs operations comprising:
   detecting, by an Alternate Designated Router (ADR) in a network, node failure of a Designated Router (DR) prior to other nodes of the network detecting the failure of the DR, wherein the DR simulates a pseudonode and wherein the DR and the ADR are in communication with each other by an inter-switch trunk (IST);
   in response to detecting node failure of the DR by the ADR, flooding, by the ADR, the network with a link state packet of the pseudonode;
   detecting, by at least one other node of the network, failure of the DR; and
   computing, by the at least one other node of the network, routes to take into account the failure of the DR.

9. The computer readable storage medium of claim 8, wherein detecting node failure of the DR by the ADR is performed via the IST.

10. The computer readable storage medium of claim 8, wherein flooding the network with the link state packet of the pseudonode prior to computing routes by the at least one other node of the network results in the prevention of routes being learned and relearned by the at least one other node of the network.

11. The computer readable storage medium of claim 10, wherein the prevention of routes being learned and relearned by the at least one other node of the network avoids route flapping.

12. The computer readable storage medium of claim 8, wherein flooding the network with the link state packet of the pseudonode prior to computing routes by the at least one other node of the network aids in convergence occurring in an expedited manner.

13. The computer readable storage medium of claim 8, wherein detecting node failure of the DR by the ADR, flooding the network with the link state packet of the pseudonode, detecting node failure of the DR by other nodes of the network, and computing routes to take into account the failure of the DR are used as part of a protocol that relies on stability of unicast route tables.

14. The computer readable storage medium of claim 8, wherein detecting node failure of the DR by the ADR, flooding the network with the link state packet of the pseudonode, detecting node failure of the DR by other nodes of the network, and computing routes to take into account the failure of the DR are used as part of a multicast protocol.

15. An Alternate Designated Router (ADR) comprising:
   a memory;
   a processor;
   a communications interface;
   an interconnection mechanism coupling the memory, the processor, and the communications interface; and
   wherein the memory is encoded with an application providing quick designated router transitions in broadcast networks for link state protocols, that when performed on the processor, provides a process for processing information, the process causing the computer system to perform the operations of:
      detecting, in a network, node failure of a Designated Router (DR) prior to other nodes of the network detecting the failure of the DR, wherein the DR simulates a pseudonode and wherein the DR and the ADR are in communication with each other by an inter-switch trunk (IST);
      in response to detecting node failure of the DR by the ADR, flooding the network with a link state packet of the pseudonode;
      detecting, by at least one other node of the network, failure of the DR; and
      computing, by the at least one other node of the network, routes to take into account the failure of the DR.

16. The ADR of claim 15, wherein detecting node failure of the DR by the ADR is performed via the IST.

17. The ADR of claim 15, wherein flooding the network with the link state packet of the pseudonode prior to computing routes by the at least one other node of the network results in the prevention of routes being learned and relearned by the at least one other node of the network.

18. The Alternate Designated Router of claim 17, wherein the prevention of routes being learned and relearned by the at least one other node of the network avoids route flapping.

19. The ADR of claim 15, wherein flooding the network with the link state packet of the pseudonode prior to computing routes by the at least one other node of the network aids in convergence occurring in an expedited manner.

20. The ADR of claim 15, wherein detecting node failure of the DR by the ADR, flooding the network with the link state packet of the pseudonode, detecting node failure of the DR by other nodes of the network, and computing routes to take into account the failure of the DR are used as part of a protocol that relies on stability of unicast route tables.

21. The ADR of claim 15, wherein detecting node failure of the DR by the ADR, flooding the network with the link state packet of the pseudonode, detecting node failure of the DR by other nodes of the network, and computing routes to take into account the failure of the DR are used as part of a multicast protocol.

* * * * *